United States Patent
Kim et al.

(10) Patent No.: US 7,609,275 B2
(45) Date of Patent: Oct. 27, 2009

(54) SYSTEM AND METHOD FOR MOSAIC RENDERING OF THREE DIMENSIONAL IMAGE

(75) Inventors: Bo Youn Kim, Taejon (KR); Ji Hyung Lee, Taejon (KR); Sung Ye Kim, Taejon (KR); Hee Jeong Kim, Seoul (KR); Bon Ki Koo, Taejon (KR)

(73) Assignee: Electronics and Telecommunications Research Institute, Taejon (KR)

( * ) Notice: Subject to any disclaimer, the term of this patent is extended or adjusted under 35 U.S.C. 154(b) by 399 days.

(21) Appl. No.: 11/600,761

(22) Filed: Nov. 17, 2006

(65) Prior Publication Data

US 2007/0132776 A1    Jun. 14, 2007

(30) Foreign Application Priority Data

Dec. 8, 2005   (KR) ............... 10-2005-0119713
Jun. 21, 2006  (KR) ............... 10-2006-0055954

(51) Int. Cl.
G06T 15/00 (2006.01)
G06T 15/30 (2006.01)
G06T 17/00 (2006.01)
G09G 5/00 (2006.01)
G06K 9/34 (2006.01)
G06K 9/40 (2006.01)
H04N 9/74 (2006.01)

(52) U.S. Cl. ............ 345/582; 345/419; 345/428; 345/619; 345/552; 382/300; 382/254; 382/171; 382/173; 348/578; 348/580

(58) Field of Classification Search ......... 345/419–420, 345/423, 581–582, 584–589, 428, 619, 653, 345/552, 629, 606, 426, 636, 664, 441, 467–469, 345/443, 472; 382/284–285, 300, 305, 171–173, 382/190, 253, 251, 254, 276, 282, 168–169; 348/578, 580, 581, 538
See application file for complete search history.

(56) References Cited

U.S. PATENT DOCUMENTS 5,317,678 A * 5/1994 Okawara et al. ............ 345/426

(Continued)

FOREIGN PATENT DOCUMENTS

WO    WO 02/056253    7/2002

OTHER PUBLICATIONS

Sang Hyun Seo et al.; "The New Area Subdivision Methods for Producing Shapes of Colored Paper Mosaic"; ICCS 2002, LNCS 2330, pp. 32-41, 2002.

(Continued)

*Primary Examiner*—Wesner Sajous
(74) *Attorney, Agent, or Firm*—Lowe Hauptman Ham & Berner, LLP

(57) ABSTRACT

A system and method for a mosaic rendering of a 3D model is provided. Textures are created using polygon information related to a vertex of each face of an inputted 3D model, a normal, and a face index, and the textures are one-to-one mapped on respective polygons of the 3D model, using a geometrical structure of the 3D mode, thereby rendering a mosaic image showing a volume and a crinkled effect of paper.

16 Claims, 2 Drawing Sheets

U.S. PATENT DOCUMENTS

| | | | |
|---|---|---|---|
| 7,038,361 B2 * | 5/2006 | Hsu et al. | 313/112 |
| 2004/0036693 A1 * | 2/2004 | Yoon et al. | 345/582 |
| 2004/0081340 A1 * | 4/2004 | Hashimoto | 382/128 |
| 2004/0196294 A1 * | 10/2004 | hong et al. | 345/582 |

OTHER PUBLICATIONS

Alejo Hausner; "Simulating Decorative Mosaics"; ACM SIGGRAPH 2001, Aug. 12-17, 2001, pp. 573-580.

* cited by examiner

SYSTEM AND METHOD FOR MOSAIC RENDERING OF THREE DIMENSIONAL IMAGE

BACKGROUND OF THE INVENTION

1. Field of the Invention

The present invention relates to a system and method for a mosaic rendering of a three-dimensional (3D) image, and more particularly, to a system and method for a mosaic rendering of a 3D image, which creates textures using polygon information of an inputted 3D model, and maps the generated textures on the 3-D model to thereby create a mosaic image with a 3D effect and a crinkled effect of paper.

2. Description of the Related Art

In general, an unrealistic rendering is being used as a method for expressing artistic models people create with computers. In most cases, the unrealistic rendering is used to create a model, which is not necessarily realistic, and to express artistic sensitivity of artists.

In a conventional mosaic-related technology, a model is divided using a particular algorithm, and divided image pieces are reconfigured to create a two-dimension based mosaic image.

Also, U.S. Patent publication No. 20040036693 discloses a method for representing a color paper mosaic using a computer, as the unrealistic rendering technique. In this specification, when textures are applied to a model using a computer, a torn portion is expressed as a white rugged portion in order to make that part look like as if it is created by hand drawing. However, this conventional technology is limited to only a two-dimension, and thus cannot replicate in the mosaic image a cubic effect created by overlapping textures or a crinkled effect of actual paper when it is glued.

SUMMARY OF THE INVENTION

Accordingly, the present invention is directed to a system and method for a mosaic rendering of a 3D model, which substantially obviates one or more problems due to limitations and disadvantages of the related art.

It is an object of the present invention to provide a system and method for a mosaic rendering of a 3D model, which creates a mosaic image by creating textures using polygon information of a 3D model and mapping the created textures on the inputted 3D model, and outputs an unrealistic mosaic image with a 3D effect created by overlapping textures and a crinkled effect of actual paper when it is glued, using the polygon information of the inputted 3D model and a geometric structure related to a curvature of a mesh.

It is another object of the present invention to provide a system and method for a mosaic rendering of a 3D model, which can create a mosaic image according to a viewpoint whenever the view point is changed because the mosaic image is rendered using polygon information of a 3D model and curvature information of a mesh.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a system for a mosaic rendering of a 3D (three-dimensional) model, including: an input module inputting a 3D model; a texture creating module creating textures using polygon information of the inputted 3D module; a mapping module one-to-one mapping the created textures on respective polygons of the 3D model, using a geometric structure of the inputted 3D model; and a rendering module rendering a mapped mosaic image.

The texture creating module uses the polygon information on a vertex, a normal, and a face index of every face of the 3D model to create a quality texture expressing a torn effect of paper, and a Tiny texture to which the polygon information on the vertex, the normal, and the face index of every face of the 3D model is allocated.

The Tiny texture is created by dividing a region into a plurality of regions and allocating information on a vertex, a normal and a face index to each divided region, wherein the region is divided by setting central points of the faces as reference points, drawing lines to pass through spots that each divide distances between central points of the faces in half, and connecting the lines connected together. The quality texture is created by randomly extending each side of the Tiny texture at the same rate on the basis of the size of the Tiny texture.

The mapping module expresses a volume by varying a length of a normal vector at a portion where the textures overlap each other, and replicates a crinkled effect of paper, using a curvature fluctuation of the 3D model. The volume is expressed by generating normal vectors of different magnitudes between a vertex of a portion where the curvature fluctuation of the 3D model is great, and the portion where the textures overlap each other. The magnitudes of the normal vectors are properly controlled by a user.

In a still further another aspect of the present invention, a method for a mosaic rendering of a 3D model, including the steps of: inputting a 3D model; creating textures, using polygon information of the inputted 3D model; one-to-one mapping the created textures on respective polygons of the 3D model, using a geometric structure of the inputted 3D model; and rendering a mapped mosaic image.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention, are incorporated in and constitute a part of this application, illustrate embodiments of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

Figure 1:
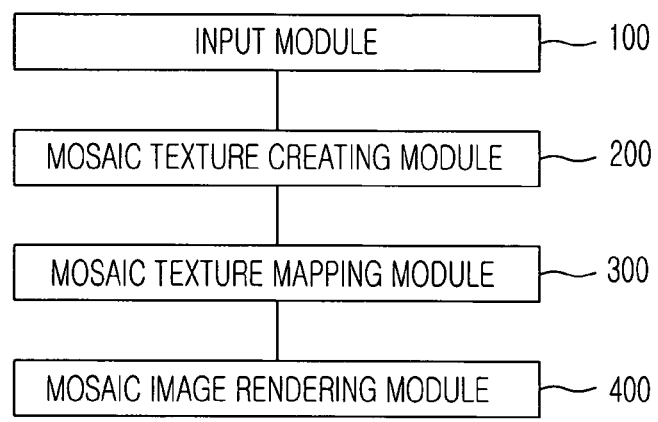
FIG. 1 is a block diagram showing a configuration of a system for a mosaic rendering of a 3D model according to the present invention.

FIG. 1 is a block diagram showing a configuration of a system for a mosaic rendering of a 3D model according to the present invention. The mosaic rendering system for a 3D model according to the present invention includes an input module 100 inputting a 3D model, a mosaic texture creating module 200 creating texture segments, using polygon information of the 3D model, a mosaic texture mapping module 300 mapping the created texture segments using curvature information of a mesh of the 3D model, and a mosaic image rendering module 400 rendering the mapped mosaic image.

The input module 100 serves to input a 3D model. As the 3D model, various kinds of 3D models including a 3D model captured using a camera, and a 3D model designed using a computer may be used.

The mosaic texture creating module 200 serves to create a texture to be mapped on the 3D model.

Figure 2:
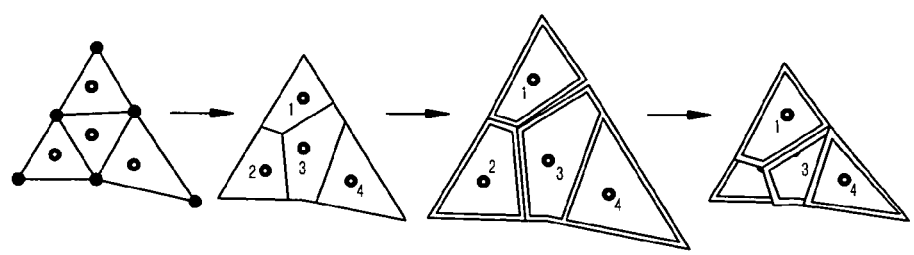
FIG. 2 is a view illustrating a method of creating texture segments for mapping.

FIG. 2 is a view illustrating a method for creating texture segments for mapping.

In the case where a 3D model is mapped in a mosaic format, the mosaic texture creating module 200 creates a Tiny texture having location information of a vertex, normal information, and a face index, for replicating a 3D effect and a crinkled effect of paper in a mapping process, and a quality texture for replicating a texture of paper.

In a process of creating the Tiny texture, information is allocated, which includes every face of the 3D model, a vertex location of each face, a normal, and a face index designated to each face as one data structure.

Then, one face is set as a reference and is connected to an adjacent face to thereby form one group (refer to FIG. 2). In such a manner, all the faces of the 3D model are grouped. The grouped faces have information on each face.

After the grouping of the 3D model, a region to be mapped on a polygon is determined.

When the region to be mapped is determined, the region is divided in such a manner that central points of the faces are set as reference points, lines are drawn to pass through spots that each divide distances between central points of the faces in half, and then the lines are connected together. The number of divided regions is as many as faces in order to achieve one-to-one mapping of one texture to one mesh.

The divided regions define small textures. Each texture has face information, position information of each vertex forming the face, normal information, and the same index as the face index allocated to the face. The small texture has the same index as the face index allocated to each face in order to make mapping of the texture on a polygon easy and convenient. The small texture generated in this manner is called a Tiny texture.

A user may determine the color of the Tiny texture, using a color palette.

The Tiny texture is created by grouping every region of the 3D object into a reference face and an adjacent face. The Tiny texture is created corresponding to a size of an actual polygon. That is, the size of the polygon determines the size of the texture to be attached to a mosaic image.

The quality texture refers to a texture to be mapped before the Tiny texture in order to express a texture of torn paper.

The quality texture is created by extending each side of the Tiny texture at the same rate on the basis of the size of the Tiny texture. Preferably, each increase rate is randomly set within a range that does not exceed 8 times of the average distance between central points of adjacent faces.

The randomly extended portion has the Tiny texture as an outline, and is made into a white region from this outline.

In order to provide realism to a mosaic image as if it is made by hand drawing, it is important to replicate a torn effect of paper.

When the torn effect of paper is visually replicated, a texture and optical properties of paper should be most importantly considered. Paper is formed of a set of many fibers, and a connection relation (e.g., vertical grain, horizontal grain) between the fibers determines features of the paper.

The paper is made of multi-layered paper texture.

The optical properties of paper give different visual impressions to the human eye according to an interaction between light and paper, and include colors, brightness, opacity, gloss, and the like. Only the visible light affects the visual impressions of the human eye, and the visual impressions vary according to how absorption, reflection and transmission of light are controlled in relation to row materials of paper. Such interactions between light and paper may be adjusted through a surface treatment.

Accordingly, in the process of creating the quality texture, the surface treatment needs to be unevenly performed in order to replicate the torn effect of paper.

As one of methods for replicating such an effect, the Perlin Noise function may be used. The Perlin Noise function recreates natural variations by adding up noise functions, which generate random numbers according to input values, at a range of different scales.

Thus, the Perlin Noise function is applied to the white region made from the outline, the Tiny texture, thereby replicating a texture of paper.

In such a manner, the texture of paper is created as the quality texture in the mosaic texture creating module 200.

Then, the Tiny texture and the quality texture created in such a manner are made to overlap each other, and are mapped on the 3D model.

The mosaic texture mapping module 300 serves to map on the 3D model the Tiny texture and the quality texture created in the mosaic texture creating module 200.

When the texture is mapped, a volume of a portion where the textures overlap each other is expressed, using information on the face, the vertex location of the face, the normal, and the face index allocated in the process of creating the texture. The crinkled effect is replicated, using the curvature information of the 3D model.

The quality texture providing the torn effect of paper is mapped first. The texture for the torn effect does not affect a normal.

After the quality texture is mapped, the Tiny texture is mapped.

The Tiny texture has the vertex information taken from a polygon and the normal information of the vertex. When the Tiny texture is mapped on the 3D model, information on a portion where the textures overlap each other is taken from a 3D polygon, and thus, a length of a normal vector is changed at a vertex (u, v) in the region where the textures overlap each other, thereby expressing a volume.

The Tiny texture that has been mapped, overlapping the quality texture has a newly determined normal, and the mosaic of the 3D model shows a volume.

Then, to replicate the crinkled effect of paper, a Tiny texture is attached to a region where a curvature fluctuation is great among many regions, and changes a length of a normal vector to a greater extent than in any other regions. The change in the normal is particularly great at a vertex where a characteristic line is produced.

Figure 3:
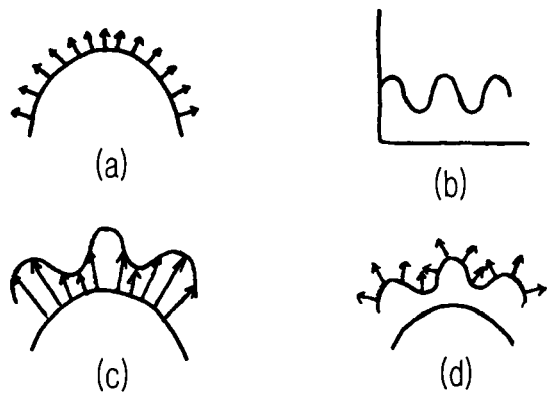
FIG. 3 is a view illustrating a method of mapping texture segments on a 3D model.

FIG. 3 is a view showing a method for mapping a texture segment on a 3D model.

When the Tiny texture is mapped in a region (A) where a curvature fluctuation is great in the 3D model, a bump map (B) is applied to a vertex O (u, v) on an original surface to produce B (u, v) (C). A length of a normal vector is changed at the vertex O (u, v) on the original surface, using B (u, v), the height of the bump, so that a new surface is created, and a normal vector with respect to the new surface is regenerated (D).

An existing bump map is used to simply express a volume of a texture. However, in the present invention, geometric information of a 3D model is taken into account, and thus the volume is expressed by generating normals in different scales between a vertex of a portion where a curvature fluctuation is great and a portion where textures overlap each other.

As for meshes, the normal vector changes in magnitude, with the largest change occurring at the portion where a characteristic point is generated, then at the portion where the textures overlap each other, and the smallest change occurring at the white region, so that a mosaic image expressing a volume may be mapped on the 3D model. A user may properly adjust the change in magnitude of the normal vector.

The mosaic image rendering module 400 renders the mapped mosaic image. The user may check the rendering result through a display unit.

Figure 4:
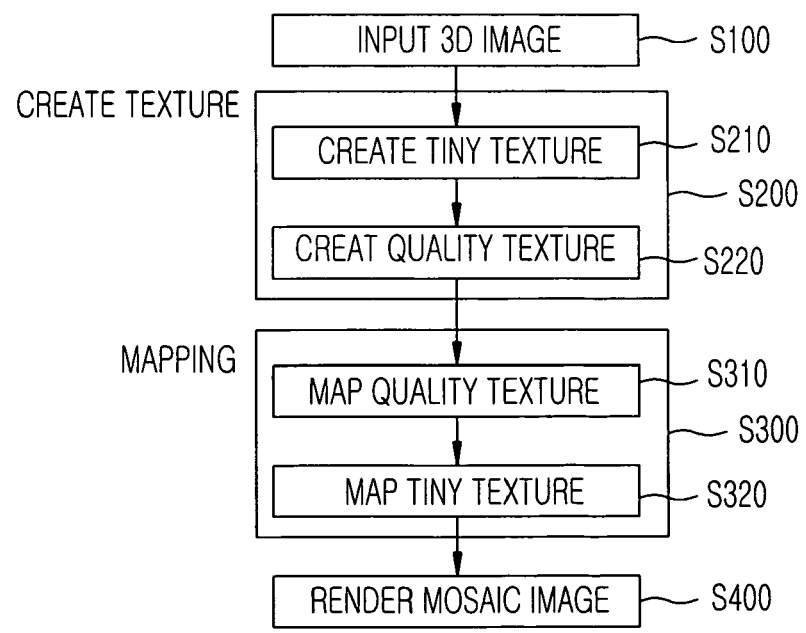
FIG. 4 is a flow chart showing a method for mosaic rendering of a 3D model according to the present invention.

FIG. 4 is a flowchart showing a method for a mosaic rendering of a 3D model according to the present invention. The method for a mosaic rendering of the 3D model includes the steps of: inputting a 3D model (S100), creating textures using polygon information of the inputted 3D model (S200), one-to-one mapping the created textures on the respective polygons of the 3D model, using a geometric structure of the inputted 3D model (S300), and rendering a mapped mosaic image (S400).

The step S200 includes the steps of: creating a Tiny texture to which polygon information on a vertex, a normal and a face index of every face of the 3D model is allocated (S210), and creating a quality texture providing a torn effect of paper (S220).

The mapping step S300 includes the steps of: mapping the quality texture expressing a texture of paper in the 3D model (S310), and mapping on the mapped quality texture the Tiny texture expressing a volume and replicating a crinkled effect of paper (S320).

In the system and method for a mosaic rendering of a 3D model according to the present invention, texture segments are one-to-one mapped on meshes, using a 3D model as if a person tears and glues colored paper, so that a mosaic image with realism may be provided.

In the system and method for a mosaic rendering of a 3D model according to the present invention, a thickness of paper and a crinkled effect of paper can be expressed, which are not expressed when a mosaic image is created using a 2D model. Also, the mosaic image may be created from various viewpoints whenever the viewpoint is changed.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A system for a mosaic rendering of a 3D (three-dimensional) model, comprising:
   an input module configured to input a 3D model;
   a texture creating module configured to create textures using polygon information on the inputted 3D model;
   a mapping module configured to perform one-to-one mapping of the created textures onto respective polygons of the 3D model, using a geometric structure of the inputted 3D model, wherein the mapping module expresses a three-dimensional effect on the 3D model by varying lengths of first normal vectors at a first portion where the textures overlap with each other; and
   a rendering module configured to render a mapped mosaic image.

2. The system of claim 1, wherein the texture creating module uses the polygon information including a vertex, a normal, and a face index of every face of the 3D model.

3. The system of claim 1, wherein the texture creating module creates a quality texture expressing a torn effect of paper, and a Tiny texture to which the polygon information including a vertex, a normal, and a face index of every face of the 3D model is allocated.

4. The system of claim 3,
   wherein the Tiny texture is created by dividing a region into a plurality of sub-regions and allocating the polygon information to each divided region, and
   wherein the region is divided by setting a plurality of points on the region as reference points, drawing lines such that each of the lines divides in half a distance between adjacent two of the plurality of points, and connecting the lines such that the connected lines define the divided region.

5. The system of claim 3, wherein the quality texture is created by randomly extending each side of the Tiny texture at the same rate on the basis of the size of the Tiny texture.

6. The system of claim 5, wherein a Perlin Noise function is applied to the quality texture in order to realistically replicate an effect of paper.

7. The system of claim 1, wherein the mapping module replicates a crinkled effect of paper, using a curvature fluctuation of the 3D model.

8. The system of claim 7, wherein the three-dimensional effect is expressed by generating second normal vectors of different magnitudes between a vertex of a second portion where the curvature fluctuation of the 3D model exists, and the first portion where the textures overlap each other.

9. The system of claim 8, wherein the magnitudes of the second normal vectors are controlled by a user.

10. A method of a mosaic rendering of a 3D model, the method comprising the steps of:
    inputting a 3D model through an input module;
    creating textures, using polygon information on the inputted 3D model;
    a mapping module one-to-one mapping the created textures on respective polygons of the 3D model, using a geometric structure of the inputted 3D model, wherein the mapping module expresses a three-dimensional effect on the 3D model by varying lengths of first normal vectors at a portion where the textures overlap with each other; and
    rendering a mapped mosaic image.

11. The method of claim 10, wherein the step of creating the textures includes the steps of: creating a Tiny texture to which the polygon information on a vertex, a normal and a face index of every face of the 3D model is allocated; and creating a quality texture expressing a torn effect of paper.

12. The method of claim 11, wherein in the step of creating the quality texture, each side of the Tiny texture is randomly extended at the same rate on the basis of the size of the Tiny texture.

13. The method of claim 12, wherein in the step of generating the quality texture, a Perlin Noise function is applied to realistically replicate an effect of paper.

14. The method of claim 10, wherein the step of mapping includes the steps of: mapping the quality texture to replicate an effect of paper on the 3D model; and mapping a Tiny texture on the mapped quality texture to express a volume and replicate a crinkled effect of paper.

15. The method of claim 14, wherein in the step of mapping, the crinkled effect of paper is replicated, using a curvature fluctuation of the 3D model.

16. The method of claim 14, wherein the three-dimensional effect is expressed by generating second normal vectors of different magnitudes between a vertex of a second portion where the curvature fluctuation of the 3D model exists, and the first portion where the textures overlap with each other.

* * * * *